(12) United States Patent
Matsunaga et al.

(10) Patent No.: US 11,967,887 B2
(45) Date of Patent: Apr. 23, 2024

(54) MOTOR APPARATUS, ELECTRIC POWER UNIT, AND WORKING MACHINE

(71) Applicant: HONDA MOTOR CO., LTD., Tokyo (JP)

(72) Inventors: Naoki Matsunaga, Wako (JP); Kazuhisa Fujiwara, Wako (JP); Hiroshi Mizuguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 341 days.

(21) Appl. No.: 17/485,804

(22) Filed: Sep. 27, 2021

(65) Prior Publication Data

US 2022/0014073 A1 Jan. 13, 2022

Related U.S. Application Data

(63) Continuation of application No. PCT/JP2019/014324, filed on Mar. 29, 2019.

(51) Int. Cl.
*H02K 9/22* (2006.01)
*H02K 5/20* (2006.01)
(Continued)

(52) U.S. Cl.
CPC ............. *H02K 9/06* (2013.01); *H02K 5/207* (2021.01); *E01C 19/402* (2013.01); *E02D 3/074* (2013.01)

(58) Field of Classification Search
CPC .. H02K 9/00; H02K 9/04; H02K 9/06; H02K 9/08; H02K 9/14; H02K 9/16; H02K 9/22;
(Continued)

(56) References Cited

U.S. PATENT DOCUMENTS 9,621,010 B2 4/2017 Stillger et al.
2007/0273220 A1* 11/2007 Koyama ................... H02K 9/14
310/58
(Continued)

FOREIGN PATENT DOCUMENTS

CN 101090216 A 12/2007
CN 103166363 A 6/2013
(Continued)

OTHER PUBLICATIONS

International Search Report dated May 14, 2019, issued in counterpart International Application No. PCT/JP2019/014324 (1 page).
(Continued)

*Primary Examiner* — Tran N Nguyen
(74) *Attorney, Agent, or Firm* — WHDA, LLP

(57) ABSTRACT

The present invention provides a motor apparatus having a motor, comprising: a fan that is rotatably supported by a shaft member of the motor, and sends, in a centrifugal direction by rotation, gas taken from an axial direction of the shaft member; and a cover member that covers the fan so as to allow the gas sent in the centrifugal direction from the fan to flow along an outer surface of the motor, wherein the cover member has a blowout port that blows out some of the gas sent in the centrifugal direction from the fan in the centrifugal direction to cool an external mechanism of the motor apparatus.

11 Claims, 10 Drawing Sheets

(51) Int. Cl.
*H02K 9/06* (2006.01)
*E01C 19/40* (2006.01)
*E02D 3/074* (2006.01)

(58) Field of Classification Search
CPC ............ H02K 9/227; H02K 5/00; H02K 5/18; H02K 5/20; H02K 5/205; H02K 5/207; H02K 11/00; H02K 11/33
See application file for complete search history.

(56) References Cited

U.S. PATENT DOCUMENTS

| | | | |
|---|---|---|---|
| 2011/0100253 A1 | 5/2011 | Koyama et al. | |
| 2014/0306559 A1 | 10/2014 | Stillger et al. | |
| 2016/0329778 A1 | 11/2016 | Kaneko | |

FOREIGN PATENT DOCUMENTS

| | | | | |
|---|---|---|---|---|
| CN | 103843231 A | * | 6/2014 | ............ H02K 9/227 |
| CN | 103843231 A | | 6/2014 | |
| CN | 105811660 A | | 7/2016 | |
| CN | 106849504 A | * | 6/2017 | |
| CN | 206332553 A | * | 7/2017 | |
| CN | 206332553 U | | 7/2017 | |
| CN | 107612194 A | | 1/2018 | |
| JP | 52-24644 B2 | | 7/1977 | |
| JP | S59117440 A | | 7/1984 | |
| JP | 3-239142 A | | 10/1991 | |
| JP | 9-252563 A | | 9/1997 | |
| JP | 2000-004561 A | | 1/2000 | |
| JP | 2000-245110 A | | 9/2000 | |
| JP | 2007-306741 A | | 11/2007 | |

OTHER PUBLICATIONS

Office Action dated Aug. 26, 2022, issued in counterpart JP Application No. 2021-511765, with partial English translation. (6 pages).
Extended (Supplementary) European Search Report dated Mar. 4, 2022, issued in counterpart EP application No. 19922531.9. (21 pages).
Office Action dated Jul. 30, 2023, issued in counterpart CN Application No. 201980094463.X, with English Translation. (18 pages).

* cited by examiner

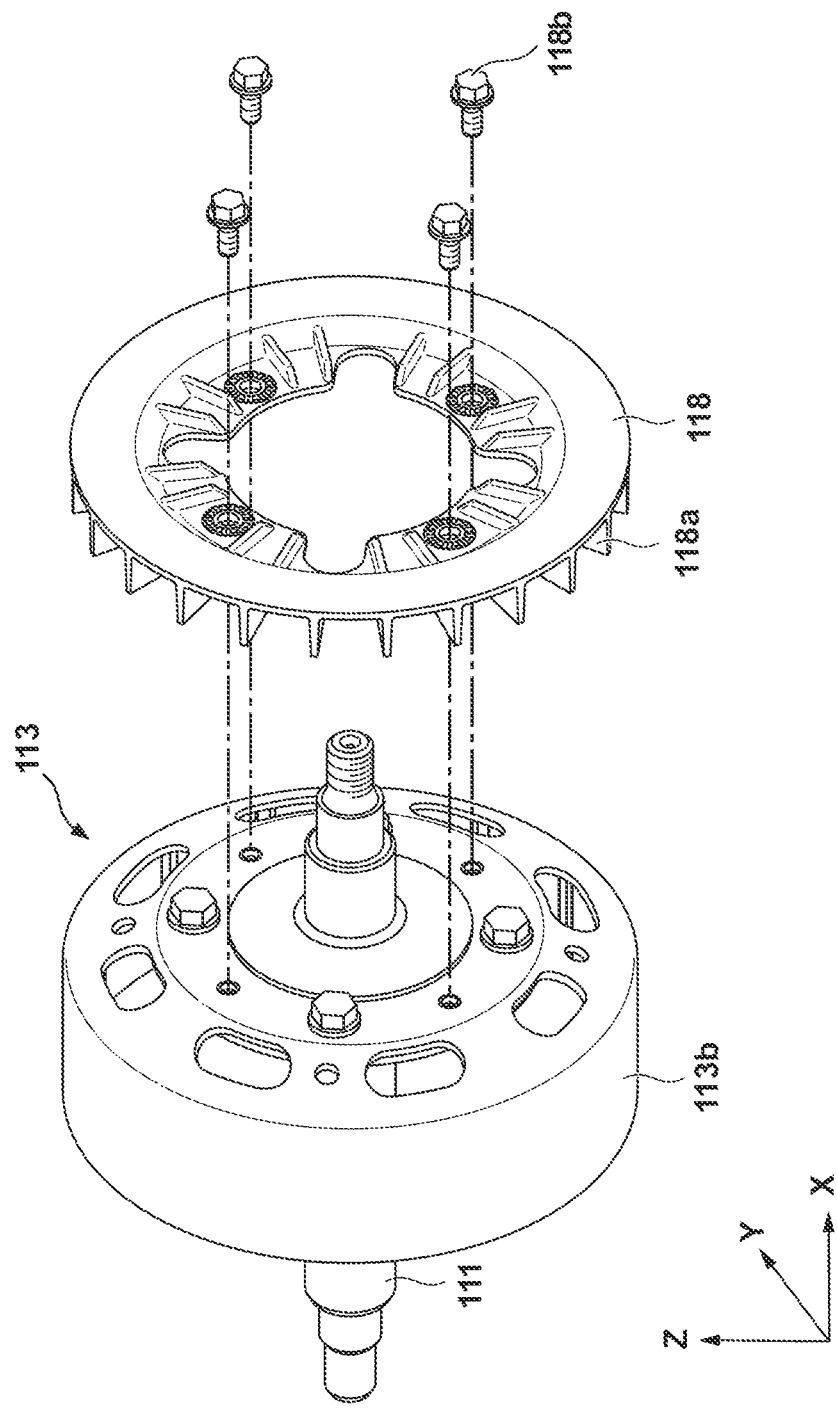

… (1 / 15)

MOTOR APPARATUS, ELECTRIC POWER UNIT, AND WORKING MACHINE

CROSS-REFERENCE TO RELATED APPLICATION(S)

This application is a continuation of International Patent Application No. PCT/JP2019/014324 filed on Mar. 29, 2019, the entire disclosures of which are incorporated herein by reference.

BACKGROUND OF THE INVENTION

Field of the Invention

The present invention relates to a motor apparatus, an electric power unit, and a working machine.

Description of the Related Art

Recently, in construction machinery such as a plate compactor, or a working machine such as a lawn mower, needs for using an electric power unit as a driving source is increased with tightening of emission regulation, environmental regulation, or the like. In such an electric power unit, for example, a motor, and a cooling mechanism for cooling the motor are provided.

Japanese Patent Laid-Open No. 3-239142 discloses a configuration in which gas sent in the centrifugal direction by rotation of a sirocco fan is straightened by straightening vanes formed on an inner circumferential surface of a lid covering the sirocco fan, and thereafter flows to radiation fins formed on an outer circumferential surface of a casing of a motor (motor, rotating machine), so that the motor is cooled. Additionally, Japanese Patent Laid-Open No. 3-239142 also discloses a configuration in which a rotation number detector provided inside a housing is cooled by use of some gas sent in the centrifugal direction from the sirocco fan.

In an electric power unit, for example, a mechanism (external mechanism) requiring cooling, such as an electrical component for driving a motor, is sometimes provided outside a housing covering a cooling fan (sirocco fan) of a motor. In this case, the external mechanism is desirably cooled by efficiently using gas sent from the cooling fan of the motor can be efficiently cooled without newly providing for cooling the external mechanism, and this is desirable in reduction in size and cost of the electric power unit.

An object of the present invention is to provide an advantageous motor apparatus to efficiently cool an external mechanism of a housing covering a cooling fan of a motor by use of the cooling fan.

SUMMARY OF THE INVENTION

According to the present invention, there is provided a motor apparatus as an aspect of the present invention is a motor apparatus having a motor, the motor apparatus comprising: a fan that is rotatably supported by a shaft member of the motor, and sends, in a centrifugal direction by rotation, gas taken from an axial direction of the shaft member; a cover member that covers the fan so as to allow the gas sent in the centrifugal direction from the fan to flow along an outer surface of the motor, characterized in that the cover member has a blowout port that blows out some of the gas sent in the centrifugal direction from the fan in the centrifugal direction to cool an external mechanism of the motor apparatus.

Further features of the present invention will become apparent from the following description of exemplary embodiments with reference to the attached drawings.

BRIEF DESCRIPTION OF THE DRAWINGS

FIG. 7B is a diagram illustrating assembly of the rotor.

DESCRIPTION OF THE EMBODIMENTS

Figure 1:
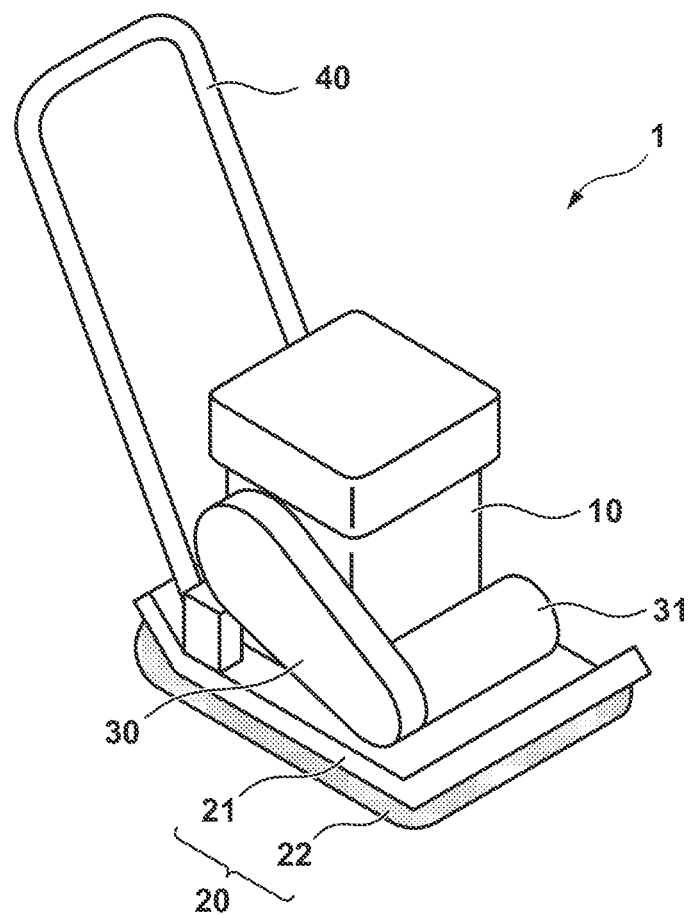
FIG. 1 is a diagram illustrating a configuration example of a working machine.

Hereinafter, embodiments of the present invention will be described with reference to the accompanying drawings. Each drawing is a schematic diagram illustrating a structure or a configuration of the embodiments, and the size of each of illustrated members does not reflect actual size. The same reference numerals denote the same or like components throughout the accompanying drawings, and Description of overlapped contents in this specification will be omitted.

In each drawing hereinafter illustrated, the respective directions orthogonal to each other on a plane parallel to the horizontal direction are defined as the X direction and the Y direction, and the direction parallel to the vertical direction is defined as the Z direction. In the following description, the axial direction is the direction in which a shaft member 111 of a motor 11 extends, and corresponds to the X direction in each drawing. The "centrifugal direction" is the direction orthogonal to the axial direction (X direction), and specifically is the direction away from a rotating shaft (namely, a shaft member 111) of the motor 11 within a YZ plane perpendicular to the axial direction. The "circumferential direction" is the rotation direction with the rotating shaft of the motor 11 as the center, and corresponds to the circumferential direction (□X direction) with an X axis as the center, in each drawing.

First Embodiment

A working machine 1 of a first embodiment according to the present invention will be described. FIG. 1 is a schematic diagram illustrating a configuration example of the working machine 1. The working machine 1 of this embodiment is a working machine (electric working machine) including an electric power unit 10 having a motor. Examples of the working machine 1 include a plate compactor, a rammer, a lawn mower, a cultivator, and a snow blower. However, in the following, the plate compactor will be described as an example. The working machine 1 includes, for example, the electric power unit 10, a working unit 20 (working mechanism), a power transmission mechanism 30, and a steering handle 40.

The electric power unit 10 has a motor apparatus 10a having the motor 11, and an electrical component 10b that drives the motor apparatus 10a (motor 11). The electrical component 10b can include, for example, a battery 10b1, and a control unit 10b2 that controls driving of the motor 11 by electric power of the battery 10b1. The control unit 10b2 is a PDU (power drive unit) in this embodiment, but may include a processor represented by a CPU, a memory device such as a semiconductor memory, an interface with an external device. A specific configuration of the electric power unit 10 will be described below.

The working unit 20 (working mechanism) is a unit for performing predetermined work, and is a main body of the working machine 1. In a case of this embodiment, the working unit 20 is a unit that performs rolling work for solidifying the ground, and can include a base 21 that is an object to be installed with the electric power unit 10 (installation object), a rolling plate 22 provided under the base 21. The rolling plate 22 is a place in contact with the ground, and is configured to be vertically movable.

The power transmission mechanism 30 transmits rotating power generated by the electric power unit 10 (motor 11) to a vibration mechanism 31. The vibration mechanism 31 has eccentric load (not illustrated) connected to the power transmission mechanism 30 so as to transmit power. The vibration mechanism 31 rotates the eccentric load by the rotating power of the motor 11 transmitted by the power transmission mechanism 30, vertically moves the rolling plate 22, and generates compaction force with respect to the ground. Consequently, the power of the electric power unit 10 is transmitted to the working unit 20 (rolling plate 22), so that the rolling plate 22 can be vertically moved, and the rolling work for solidifying the ground can be performed. The steering handle 40 is formed in a bar shape such that a user can hold the steering handle. Consequently, the user can perform rolling work while pushing the working machine 1 through the steering handle 40.

[Configuration Example of Electric Power Unit]

Figure 2:
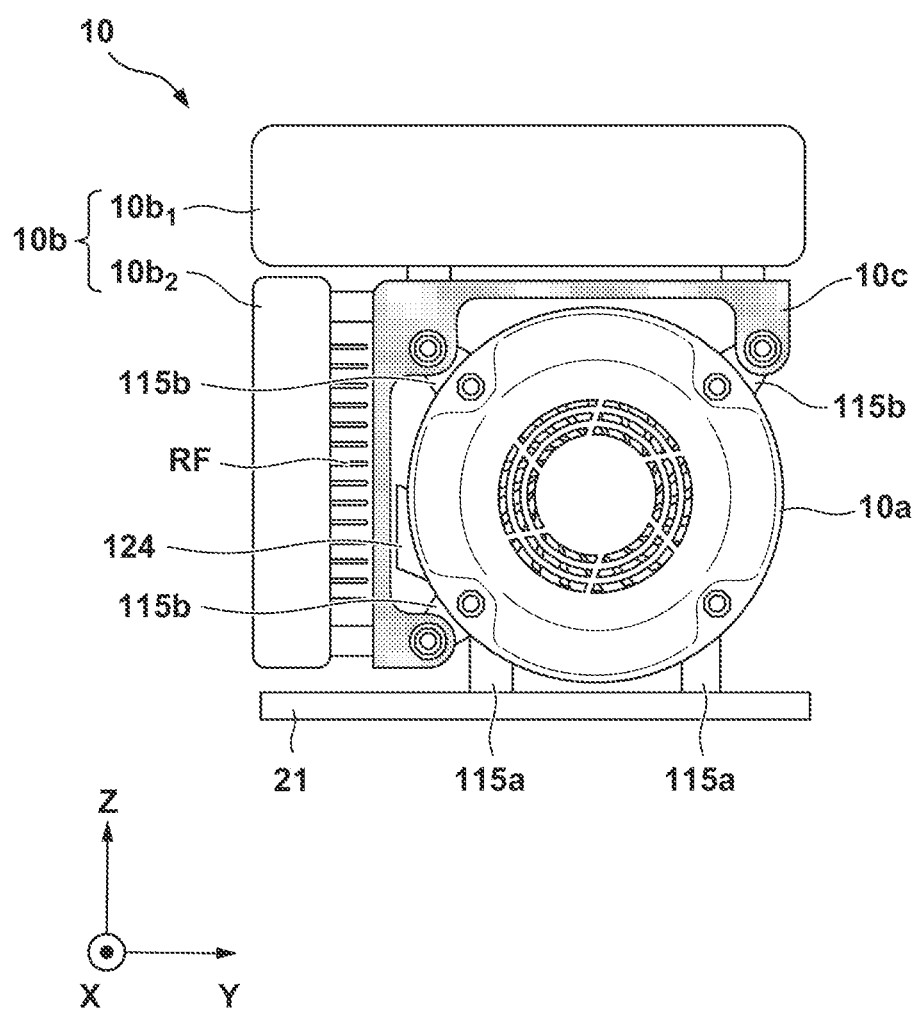
FIG. 2 is a diagram illustrating a configuration example of an electric power unit.

A configuration example of the electric power unit 10 of this embodiment will be described. FIG. 2 is a schematic diagram illustrating the configuration example of the electric power unit 10, and illustrates a state in which an exterior cover covering the electric power unit 10 is removed. As described above, the electric power unit 10 of this embodiment includes, for example, the motor apparatus 10a, the battery 10b1, and the control unit 10b2. The motor apparatus 10a can include the motor 11, and a cooling mechanism 12 for cooling the motor 11, while the specific configuration thereof will be described below.

First mounting parts 115a provided on a lower side of the motor 11 are fixed to the base 21 by screws or the like, so that the motor apparatus 10a is fixed to the base 21. In the motor apparatus 10a (motor 11), second mounting parts 115b mounted with the electrical component 10b (battery 10b1, control unit 10b2) is provided on the motor 11. Specifically, a support frame 10c (support member) for supporting the battery 10b1 and the control unit 10b2 is mounted on the second mounting parts 115b of the motor apparatus 10a by screws or the like.

In a case of this embodiment, as illustrated in FIG. 2, the first mounting parts 115a of the motor apparatus 10a can be directly mounted on the base 21 without interposing a vibration proof mechanism such as an elastic member (for example, rubber). The three second mounting parts 115b are provided in the motor apparatus 10a, and the L-shaped support frame 10c is mounted on the three second mounting parts 115b. The battery 10b1 is mounted on the support frame 10c above the motor apparatus 10a, and the control unit 10b2 is mounted on the support frame 10c on the lateral side (−Y direction side) of the motor apparatus 10a. The battery 10b1 and the control unit 10b2 are thus disposed, so that it is possible to make the electric power unit 10 compact, and improve versatility.

Herein, in this embodiment, the battery 10b1 is disposed above the motor apparatus 10a, and the control unit 10b2 is disposed on a lateral side of the motor apparatus 10a. However, location of the battery 10b1 and the control unit 10b2 is not limited to this. For example, the battery 10b1 may be disposed on the lateral side of the motor apparatus 10a, and the control unit 10b2 may be disposed above the motor apparatus 10b. The support frame 10c of this embodiment is formed in an L-shape in order to support both the battery 10b1 and the control unit 10b2. However, the present invention is not limited to this, and the support frame may be individually provided in each of the battery 10b1 and the control unit 10b2. The support frame 10c may be mounted on the motor apparatus 10a (second mounting parts 115b) through a vibration proof mechanism such as an elastic member (for example, rubber).

[Configuration Example of Motor Apparatus]

Figure 3:
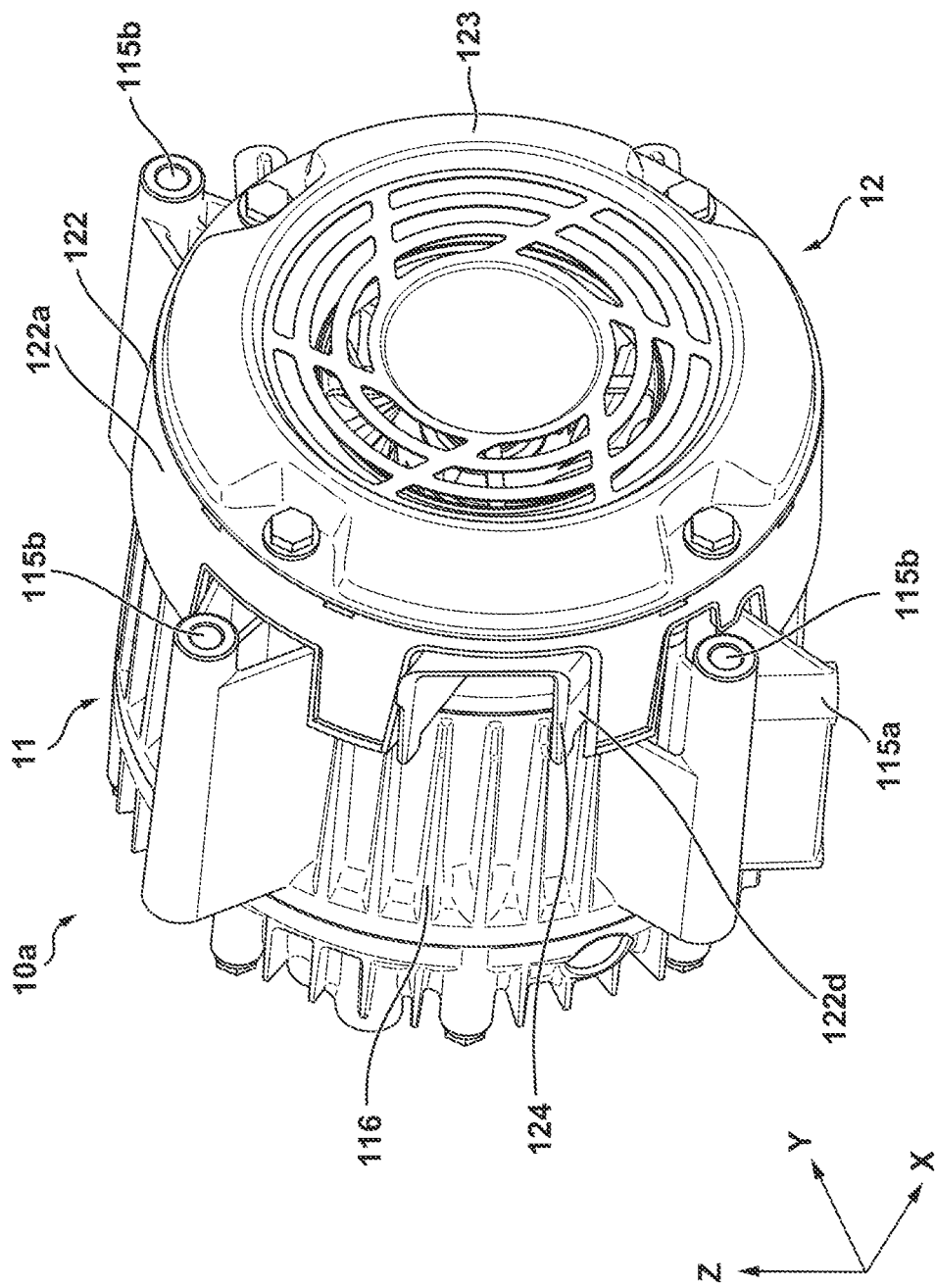
FIG. 3 is a diagram illustrating an external appearance of a motor apparatus.
Figure 4:
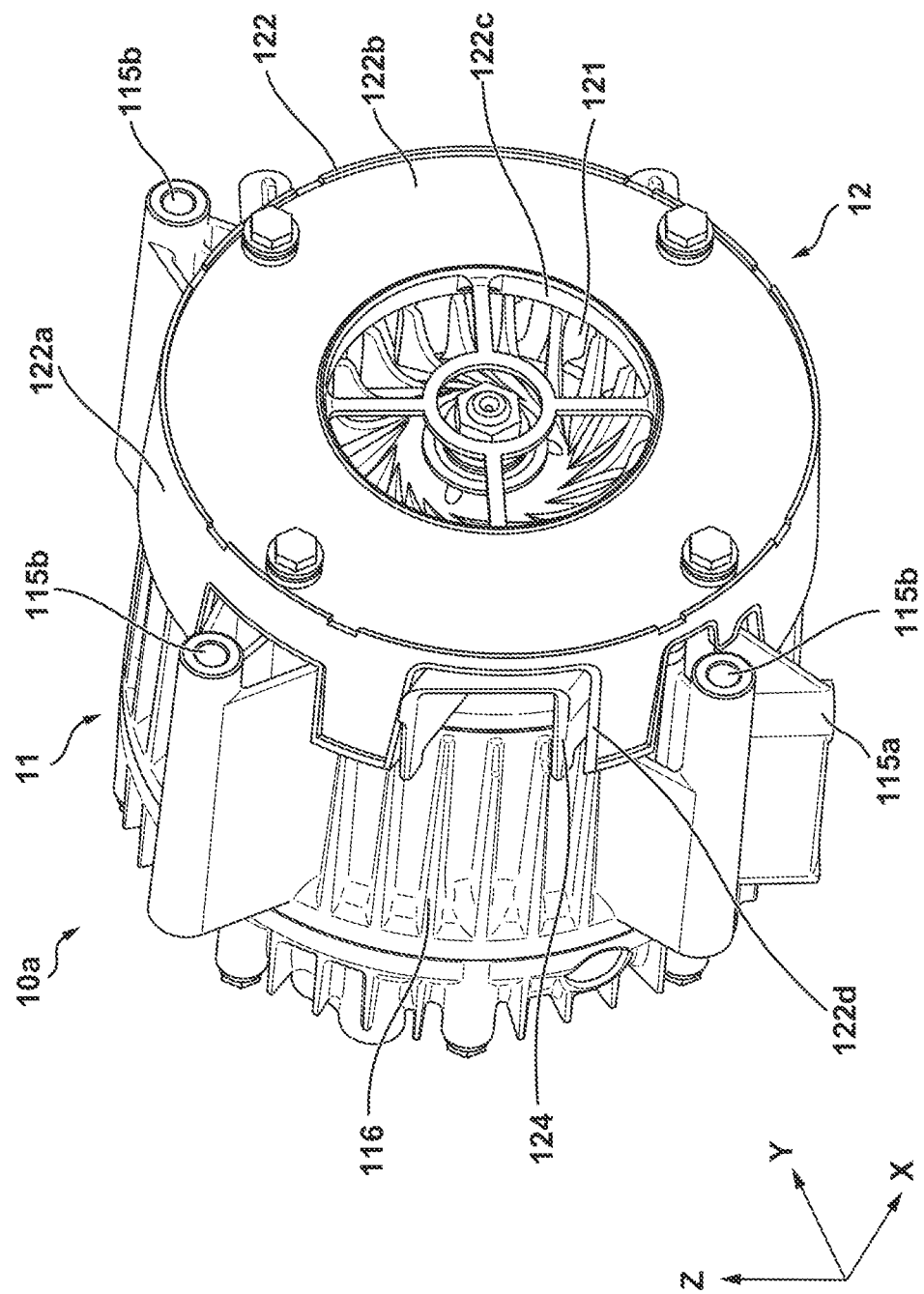
FIG. 4 is a diagram illustrating an external appearance of the motor apparatus with a safety cover removed.
Figure 5:
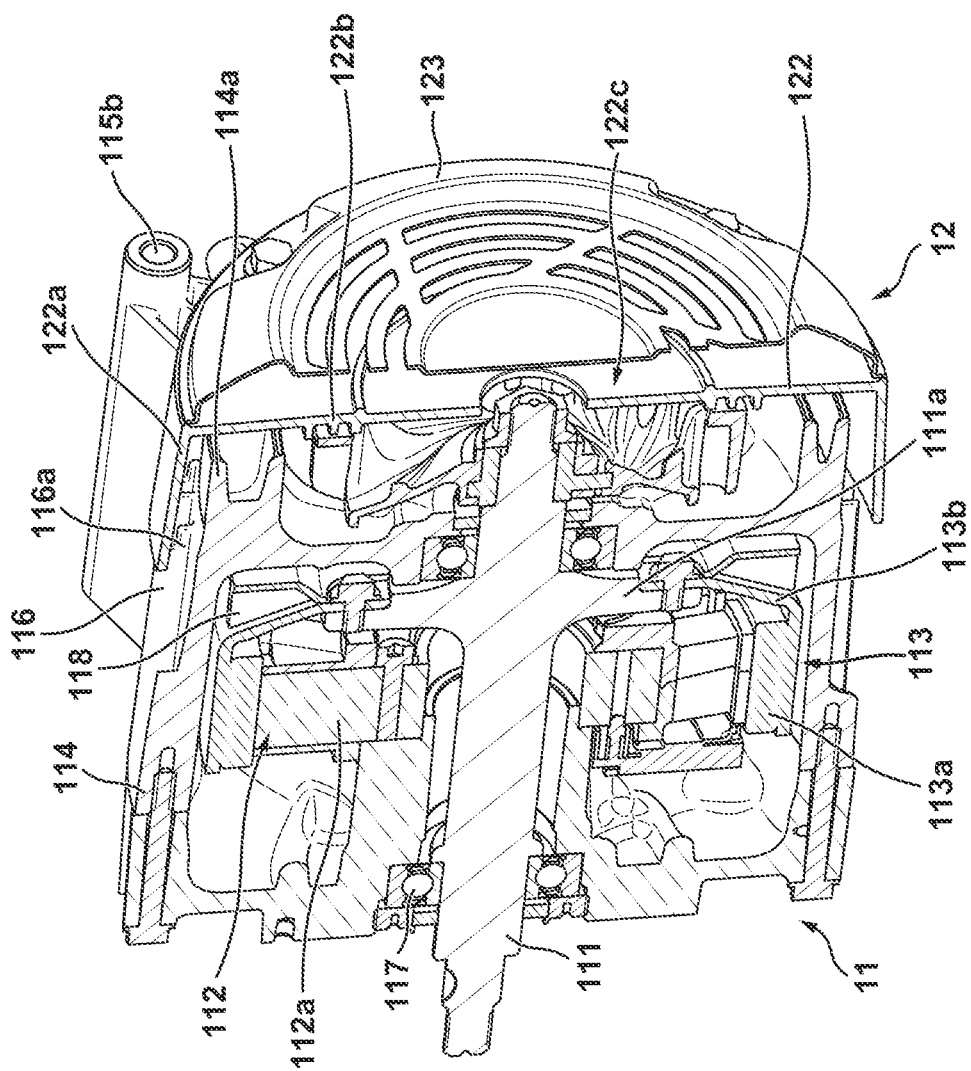
FIG. 5 is a sectional perspective view of the motor apparatus.
Figure 6:
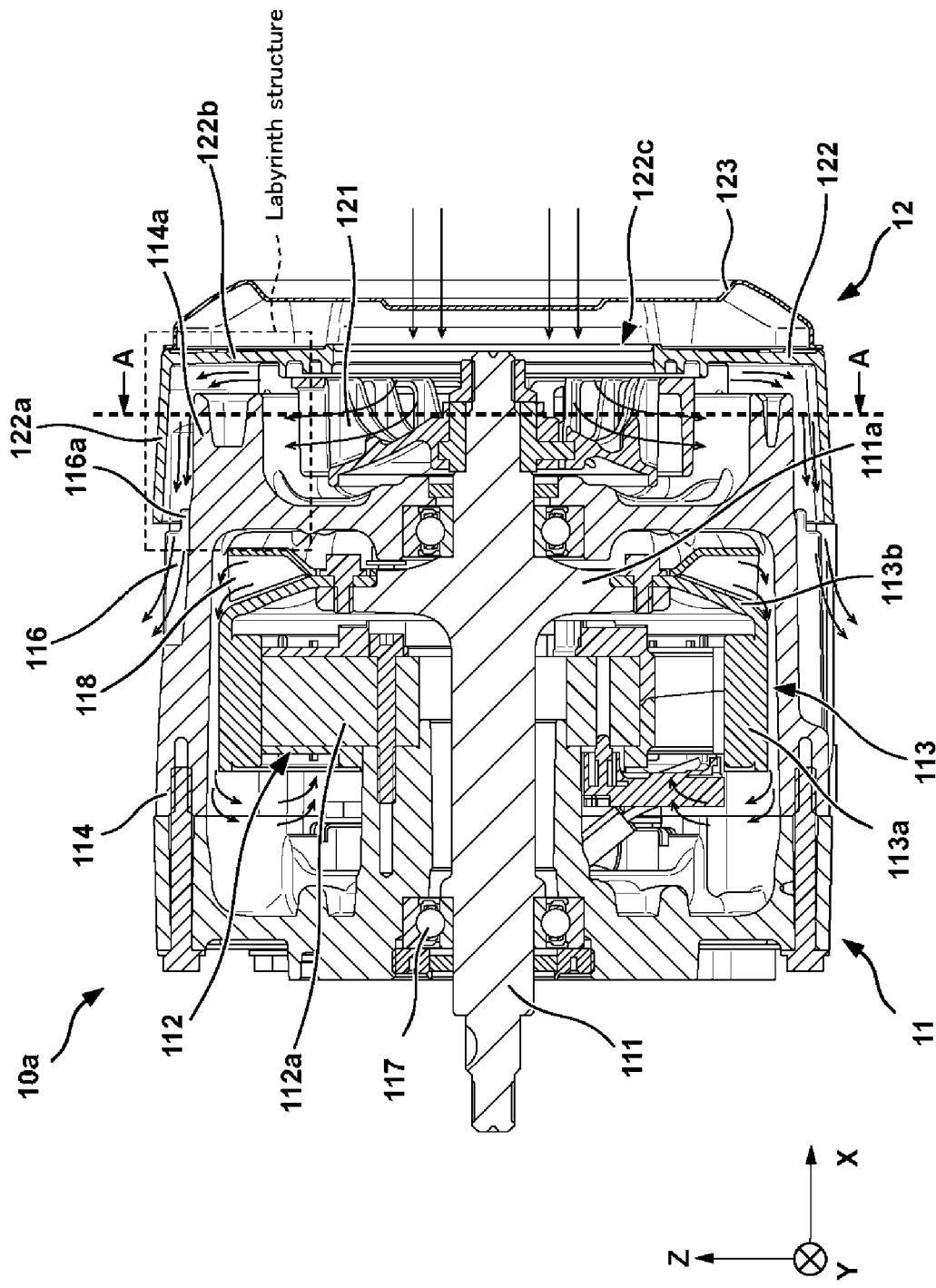
FIG. 6 is a sectional plan view of the motor apparatus.

A configuration example of the motor apparatus 10a of this embodiment will be described. As described above, the motor apparatus 10a can include the motor 11, and the cooling mechanism 12 for cooling the motor 11. FIG. 3 is a diagram illustrating the external appearance of the motor apparatus 10a, and illustrates the motor apparatus 10a removed from the electric power unit 10. FIG. 4 is a diagram illustrating the external appearance of the motor apparatus 10a with a safety cover 123. The safety cover 123 is a member for covering an intake port 122c (opening) formed in a cover member 122, and is provided in order to prevent a worker from inserting his/her hand or finger into the intake port 122c, for example. FIG. 5 is a sectional perspective view (diagram obliquely viewed from a XZ cross section) of the motor apparatus 10a, and FIG. 6 is a sectional plan view (diagram of the XZ cross section viewed from the −Y direction side) of the motor apparatus 10a.

First, a configuration of the motor 11 will be described. The motor 11 can include, for example, the shaft member 111, a stator 112, a rotor 113, and a motor case 114. In a case of this embodiment, the motor 11 is an outer rotor type motor in which the stator 112 is disposed between the shaft member 111 and the rotor 113, coils 112a are provided in the stator 112, and a magnet 113a is provided in the rotor 113. In the motor 11 thus configured, electric power (for example, current) to be supplied to the coils 112a of the stator 112 is controlled, so that the rotor 113 is rotated, and rotating power can be generated in the shaft member 111.

The shaft member 111 is rotatably supported by the motor case 114 through a bearing mechanism 117 such as a bearing, and functions as the rotating shaft of the motor 11. The power transmission mechanism 30 (for example, a belt) is connected to an end on the −X direction side of the shaft member 111, and the rotating power of the shaft member 111 generated by the stator 112 and the rotor 113 is transmitted to the working unit 20 (rolling plate 22) through the power transmission mechanism 30 and the vibration mechanism 31.

The stator 112 is stored in the motor case 114, and is supported by the motor case 114. In a case of this embodiment, the stator 112 has the coils 112a supported by the motor case 114 between the shaft member 111 and the rotor 113 (magnet 113a). A plurality of the coils 112a can be provided along the circumferential direction so as to surround the shaft member 111. The rotor 113 is stored in the motor case 114, and is supported by the shaft member 111. In a case of this embodiment, the rotor 113 can include a rotor yoke 113b mounted on a projecting part 111a of the shaft member 111, and the magnet 113a mounted on an inner side surface of the rotor yoke 113b. The rotor 13 has an internal fan 118 provided on an outer surface on the +X direction side of the rotor yoke 113b.

Figure 7A:
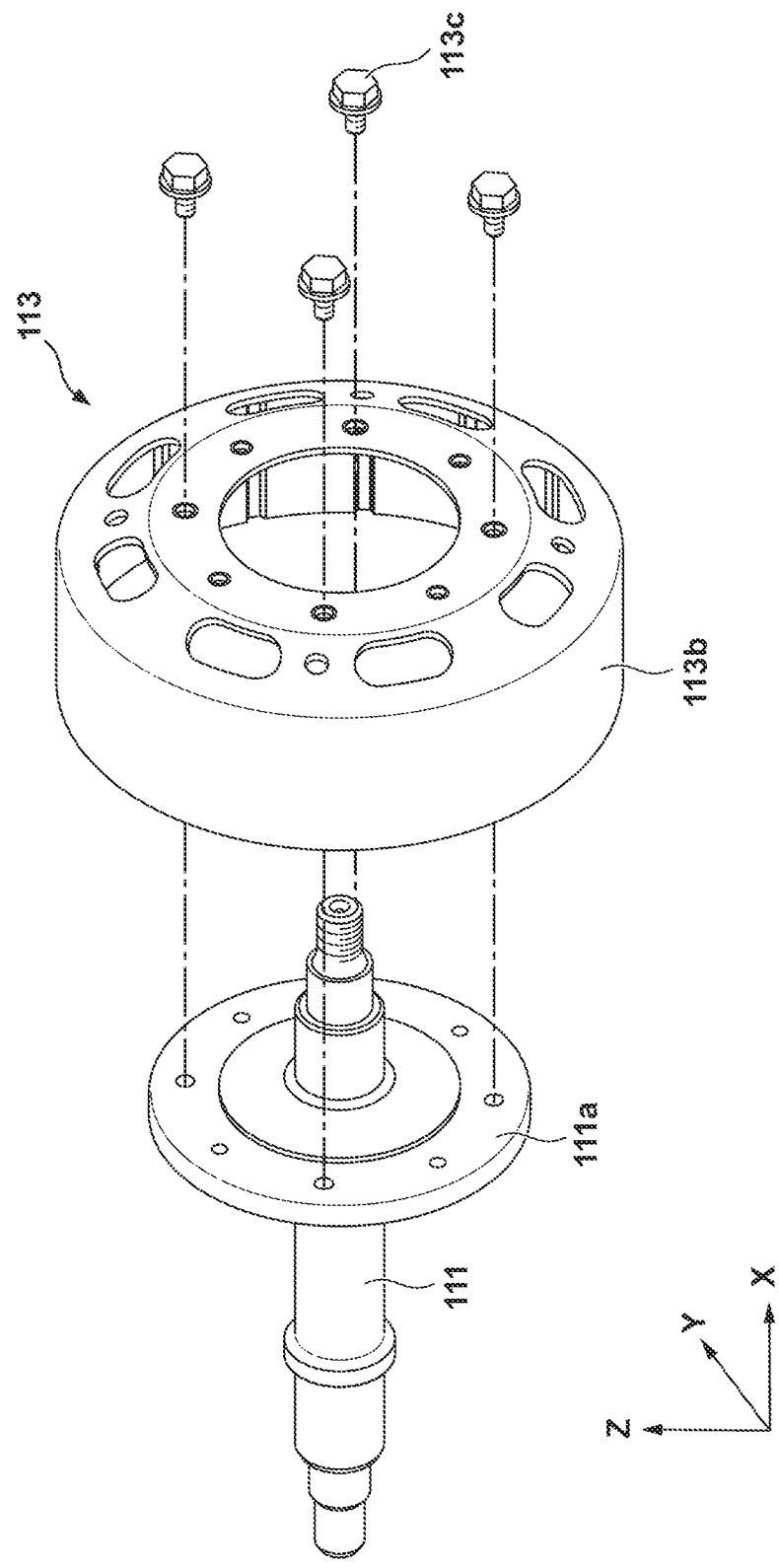
FIG. 7A is a diagram illustrating assembly of a rotor.

Herein, a specific configuration of the rotor 113 will be described with reference to FIG. 7A to FIG. 7B. FIG. 7A to FIG. 7B are each a diagram illustrating assembly of the rotor 113. As illustrated in FIG. 7A, the rotor yoke 113b is formed in, for example, a bowl shape (bowl shape), and is mounted on the projecting part 111a of the shaft member 111 by screws 113c. As illustrated in FIG. 7B, the internal fan 118 can be mounted on an outer surface on the +X direction side of the rotor yoke 113a by the screws 118b. The internal fan 118 is configured by radially arranging a plurality of blade parts 118a along the circumferential direction so as to surround the shaft member 111, and rotates together with the rotor yoke 113b, so that gas (for example, air) is sent in the centrifugal direction. Such an internal fan 118 is provided, so that as illustrated by arrows in FIG. 6, the gas is circulated in an internal space of the motor case 114 storing the stator 112 and the rotor 113, and heat generated from the coils 112a of the stator 112 can be effectively transmitted to the rotor case 114.

The motor case 114 is made of a material having high thermal conductivity and high rigidity such as metal, rotatably supports the shaft member 111, and stores the stator 112 and the rotor 113. As described above with reference to FIG. 2, the first mounting parts 115a for mounting the motor apparatus 10a (motor 11) on the base 21, and the second mounting parts 115b mounted with the support frame 10c that supports the electrical component 10b are provided in the motor case 114. The motor case 114 has a protruding part 114a that protrudes in the axial direction (+X direction) so as to surround the centrifugal direction side of a cooling fan 121 of the cooling mechanism 12 described below. This protruding part 114a has a function of forming a flow passage for allowing gas sent from the cooling fan 121 along an outer circumference of the motor case 114 in cooperation with the cover member 122 of the cooling mechanism 12 as illustrated by arrows in FIG. 6, and protecting the cooling fan 121 against impact from outside of the motor apparatus 10a.

As illustrated in FIG. 3 to FIG. 6, a plurality of radiation fins 116 arranged on an outer surface of the motor case 114 along the circumferential direction are provided in order to release heat of the motor case 114. Each radiation fin 116 has such a shape as to protrude in the centrifugal direction from an outer surface of the motor case 114, and extend along the axial direction (X direction). Additionally, each radiation fin 116 is configured such that an amount of protrusion in the centrifugal direction at an end 116a on the cooling mechanism 12 side (cover member 122 side, +X direction side) is smaller than an amount of protrusion in the centrifugal direction at other portion, and each end 116a is covered with the cover member 122 (first portion 122a) of the cooling mechanism 12 described below. In a case of this embodiment, the protrusion amount of the end 116a of each radiation fin 116 is made smaller than the protrusion amount of the other portion by a step. However, the present invention is not limited to this, and each end 116a may be formed in a slope shape having a protrusion amount gradually reducing toward the cooling mechanism 12 (namely, toward the +X direction). The end 116a thus configured is provided in each radiation fin 116, so that gas blown from a gap between the motor case 114 and the cover member 122 is straightened, and can be efficiently guided between the plurality of radiation fins 116. Furthermore, when external impact (stress) is applied to the cover member 122 (first portion 122a), the cover member 122 can be supported by the respective ends 116a of the radiation fins 116, and therefore deformation of the cover member 122 (first portion 122a) can be stayed in an elastic deformation region, and damage (plastic deformation) can be prevented. Additionally, each end 116a is configured such that the amount of protrusion in the centrifugal direction is smaller than the amount of protrusion in the centrifugal direction of the other portion, and therefore it is possible to suppress projection of the cover member 122 (first portion 122a) toward outside (in the Z direction), and downsizing can be attained.

Next, a configuration of the cooling mechanism 12 will be described. The cooling mechanism 12 can include, for example, the cooling fan 121, the cover member 122, the safety cover 123, and air guide member 124 (guide member). The cooling mechanism 12 is a mechanism that cools the motor 11 (motor case 114) by rotating the cooling fan 121 by power of the motor 11, and allowing gas sent by the rotation of the cooling fan to flow onto the outer surface of the motor case 114.

Figure 8:
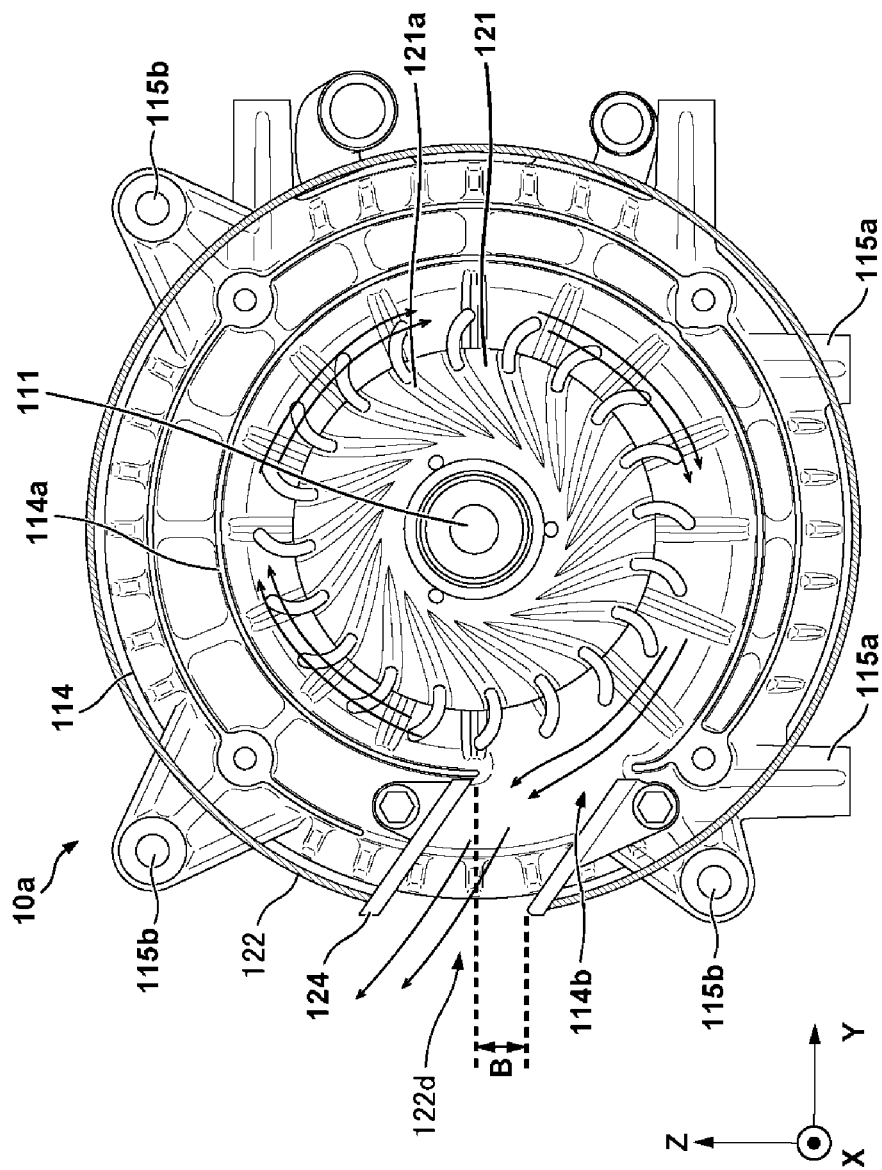
FIG. 8 is a sectional view illustrating the motor apparatus with a cover member and the safety cover removed.

The cooling fan 121 is rotatably pivoted on the shaft member 111 of the motor 11, and rotates, so that gas taken from the axial direction (+Z direction) is sent in the centrifugal direction. As illustrated in FIG. 8, a plurality of blade parts 121a each having a plan intersecting with the circumferential direction are arranged along the circumferential direction so as to surround the shaft member 111, so that the cooling fan 121 of this embodiment is configured. FIG. 8 is a sectional view taken along A-A in FIG. 6. The cooling fan 121 thus configured is rotated by rotating power of the shaft member 111, so that gas is taken from the axial direction (+Z direction), and can be sent in the centrifugal direction. The configuration of the cooling fan 121 is not limited to the above configuration, and other configuration such as a sirocco fan may be used.

The cover member 122 is a member that covers the cooling fan 121 such that the gas sent in the centrifugal direction from the cooling fan 121 flows along the outer surface of the motor 11 (motor case 114). In a case of this embodiment, as illustrated in FIG. 5 to FIG. 6, the cover member 122 can include the first portion 122a that covers the centrifugal direction side of the cooling fan 121, and a second portion 122b that covers the axial direction side (+X direction side) of the cooling fan 121.

Specifically, the first portion 122a of the cover member 122 covers the centrifugal direction side of the protruding part 114a such that a gap is formed between the protruding part 114a of the motor case 114 and the first portion 122a. The first portion 122a can be configured so as to also cover the ends 116a of the radiation fins 116 provided in the motor case 114. The second portion 122b of the cover member 122 covers the axial direction side (+X direction side) of the protruding part 114a and the cooling fan 121 such that a gap is formed between the protruding part 114a of the motor case 114 and the first portion 122a. The intake port 122c for allowing the cooling fan 121 to take gas therein is formed in the second portion 122b. The safety cover 123 for preventing a worker from inserting his/her hand or finger into the intake port 122*c* is provided on the +X direction side of the second portion 122*b*.

The cover member 122 is thus configured, so that as illustrated by arrows in FIG. 6, the gap between the first portion 122*a* and the protruding part 114*a*, and the gap between the second portion 122*b* and the protruding part 114*a* functions as flow passages for the gas sent in the centrifugal direction from the cooling fan 121, and the gas can efficiently flow along the outer surface of the motor case 114. That is, it is possible to efficiently guide the gas sent from the cooling fan 121 onto the outer surface of the motor 11, and effectively cool the motor case 114. A labyrinth structure is formed by the cover member 122 and the protruding part 114*a* of the motor case 114, and therefore there is an advantage in a waterproof property and a dust-proof property. Additionally, the blade parts 121*a* of the cooling fan 121 is provided so as to protrude on the axial direction side, (+X direction side), that is, on the second portion 122*b* side of the cover member 122 with respect to the protruding part 114*a*, so that the gas sent in the centrifugal direction from the cooling fan 121 can be directly supplied to the gap (flow passage) formed between the second portion 122*b* and the protruding part 114*a*, and the motor case 114 can be more effectively cooled.

Herein, as illustrated in FIG. 3 to FIG. 4, a blowout port 122*d* (opening, cutout part) that blow out some of the gas sent in the centrifugal direction from the cooling fan 121 in the centrifugal direction is provided in the cover member 122 in order to cool the external mechanism of the motor apparatus 10*a*. In a case of this embodiment, the blowout port 122*d* is formed on the control unit 10*b*2 side on the first portion 122*a* of the cover member 122 in order to cool the control unit 10*b*2 disposed on the lateral side (-Y direction side) of the motor apparatus 10*a*.

As illustrated in FIG. 8, in the protruding part 114*a* of the motor case 114, an opening 114*b* is provided between the cooling fan 121 and the blowout port 122*d* of the cover member 122. The opening 114*b* may be provided at a position offset in the rotation direction (circumferential direction) of the cooling fan 121 with respect to the blowout port 122*d* of the cover member 122 along the direction of flow of the gas sent from the cooling fan 121. Namely, the opening 114*b* may be provided so as to overlap with at least a part (for example, a range B of FIG. 8) of the blowout port 122*d* of the cover member 122 in the rotation direction (circumferential direction) of the cooling fan 121. By this opening 114*b*, the flow velocity of the gas to be sent from the cooling fan 121, and the flow velocity of the gas to be blown from the blowout port 122*d* are made close (namely, flow velocity difference is made within an allowable range), and the gas sent in the centrifugal direction from the cooling fan 121 can be blown from the blowout port 122*d* so as to keep the flow velocity of the gas.

Figure 9:
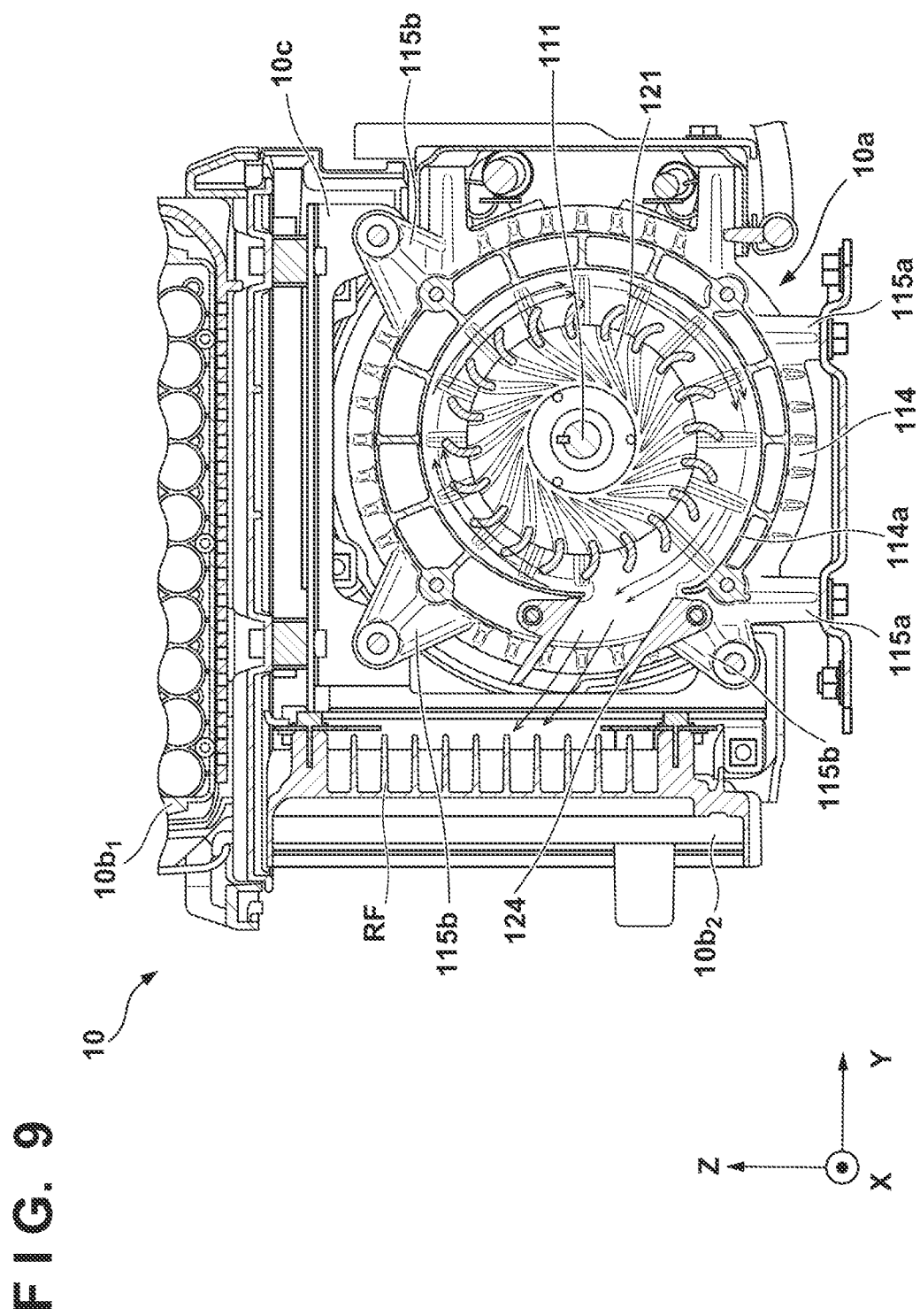
FIG. 9 is a sectional view for illustrating cooling of a control unit using a cooling mechanism of the motor apparatus.

The air guide member 124 is a member for guide the gas blown from the blowout port 122*d* to the external mechanism of the motor apparatus 10*a*. The air guide member 124 has such a cylindrical shape (for example, a rectangular cylindrical shape) as to communicate the opening 114*b* of the motor case 114 (protruding part 114*a*) with the blowout port 122*d* of the cover member 122, and protrude outward from the blowout port 122*d*. In a case of this embodiment, the air guide member 124 is configured such that the gas blown from the blowout port 122*d* is guided to the control unit 10*b*2. Specifically, as illustrated in FIG. 9, the control unit 10*b*2 has a plurality of radiation fins RF, and can be supported by the support frame 10*c* such that a plurality of cooling fins RF face the motor apparatus 10*a* side. The air guide member 124 is provided such that the blowout port 122*d* is directed to the radiation fins RF of the control unit 10*b*2, so that the gas blown from the blowout port 122*d* is guided to the radiation fins RF of the control unit 10*b*2.

As described above, the motor apparatus 10*a* of the this embodiment is configured such that the gas sent from the cooling fan 121 is blown out toward the external mechanism of the motor apparatus 10*a* such as the control unit 10*b*2 to cool the external mechanism, in the cooling mechanism 12 that cools the motor 11. Consequently, even when a cooling fan for cooling the external mechanism is newly provided, the external mechanism can be cooled by efficiently using the gas sent from the cooling fan of the motor 11, and therefore there is an advantage in compactification and cost reduction of the electric power unit 10.

Other Embodiment

In the above embodiment, an example in which the blowout port 122*d* is provided in the cover member 122 so as to cool the control unit 10*b*2 is described. However, the present invention is not limited to this, and a blowout port 122*d* may be provided in a cover member 122 so as to cool other external mechanism such as a battery 10*b*1. The number of the blowout ports 122*d* to be provided in the cover member 122 is not limited to one, and a plurality of the blowout ports 122*d* may be provided in the cover member 122 in accordance with the number or location of external mechanisms to be cooled.

Summary of Embodiments

1. The motor apparatus of the above embodiments is a motor apparatus (for example, 10*a*) having a motor (for example, 11) including:
    a fan (for example, 121) that is rotatably supported by a shaft member (for example, 111) of the motor, and sends, in a centrifugal direction by rotation, gas taken from an axial direction of the shaft member;
    a cover member (for example, 122) that covers the fan so as to allow the gas sent in the centrifugal direction from the fan to flow along an outer surface of the motor, wherein
    the cover member has a blowout port (122*d*) that blows out some of the gas sent in the centrifugal direction from the fan in the centrifugal direction to cool an external mechanism (for example, 10*b*2) of the motor apparatus.
    According to this configuration, gas sent from the cooling fan for cooling the motor can be used, not only for cooling the motor, but also for cooling the external mechanism by blowing the gas toward the external mechanism of the motor apparatus. That is, even if a cooling fan for cooling the external mechanism is not newly provided, the gas sent from the cooling fan of the motor can be efficiently used to cool the external mechanism. Therefore, it can be advantageous in terms of compactness and cost reduction of the electric power unit having the motor apparatus.

2. In the motor apparatus of the above embodiments,
    the cover member includes a first portion (for example, 122*a*) that covers a side in the centrifugal direction of the fan, and a second portion (for example, 122*b*) that covers a side in the axial direction of the fan, and
    the blowout port is provided in the first portion.

According to this configuration, gas sent from the cooling fan for cooling the motor can be efficiently blown out from the blowout port.

3. In the motor apparatus of the above embodiments,
the second portion of the cover member has an intake port (for example, 122c) for allowing the fan to take gas therein.

According to this configuration, the cooling fan for cooling the motor can efficiently take in gas.

4. In the motor apparatus of the above embodiments,
the motor includes a motor case (for example, 114) that stores a stator (for example, 112) and a rotor (for example, 113), and
the motor case has a protruding part (for example, 114a) that protrudes in the axial direction between the fan and the cover member so as to surround the side in the centrifugal direction of the fan.

According to this configuration, a flow passage for flowing gas sent from the cooling fan along the outer circumference of the motor case can be formed in cooperation with the cover member. In addition, the cooling fan can be protected against an impact from an outside of the motor apparatus.

5. In the motor apparatus of the above embodiments,
the protruding part has an opening (for example, 114b) between the fan and the blowout port of the cover member.

According to this configuration, gas can be blown out from the blowout port of the cover member so as to maintain the flow velocity of the gas sent in the centrifugal direction from the cooling fan. In addition, since it is possible to prevent a large amount of gas sent from the cooling fan from flowing along the outer surface of the motor, the flow rate of the gas blown out from the blowout port of the cover member can be secured, and the external mechanism of the motor apparatus can be efficiently cooled.

6. In the motor apparatus of the above embodiments,
the opening is provided in the protruding pan so as to overlap with at least a part of the blowout port of the cover member in a rotation direction of the fan.

According to this configuration, it is possible to efficiently cool the external mechanism of the motor apparatus by using gas sent in the centrifugal direction from the cooling fan.

7. In the motor apparatus of the above embodiments,
a labyrinth structure is formed by the cover member and the protruding part of the motor case.

According to this configuration, since it is possible to prevent a large amount of gas sent from the cooling fan from flowing along the outer surface of the motor, the flow rate of the gas blown out from the blowout port of the cover member can be secured, and the external mechanism of the motor apparatus can be efficiently cooled. In addition, it is advantageous in terms of waterproofness and dustproofness of the motor apparatus.

8. In the motor apparatus of the above embodiments,
the motor case has a plurality of radiation fins (for example, 116) extending along the axial direction on an outer surface, and
a protrusion amount in the centrifugal direction of an end (for example, 116a) of each of the radiation fins on a side of the cover member is made smaller than a protrusion amount of another portion.

According to this configuration, gas blown out from a gap between the motor case and the cover member can be rectified and efficiently guided between the plurality of radiation fins.

9. In the motor apparatus of the above embodiments,
the ends of the radiation fins are covered with the cover member.

According to this configuration, since gas can be rectified before the gas is blown out from the gap between the motor case and the cover member, the gas can be efficiently guided between the plurality of radiation fins.

10. The motor apparatus of the above embodiments includes
an air guide member (for example, 124) for guiding, to an external mechanism of the motor apparatus, gas blown from the blowout port.

According to this configuration, since gas blown out from the blowout port of the cover member can be appropriately guided to the external mechanism, the external mechanism can be cooled more efficiently.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A motor apparatus having a motor, comprising:
a fan that is rotatably supported by a shaft member of the motor, and is configured to take gas from an axial direction of the shaft member and send the gas in a centrifugal direction by rotation; and
a cover member that covers the fan so as to allow the gas sent in the centrifugal direction from the fan to flow along an outer surface of the motor,
wherein the cover member has a blowout port that blows out a part of the gas sent in the centrifugal direction from the fan in the centrifugal direction to cool an external mechanism of the motor apparatus,
the motor includes a motor case that stores a stator and a rotor,
the motor case has a protruding part that protrudes in the axial direction between the fan and the cover member so as to surround, in the centrifugal direction, a side of the fan, and
the protruding part has an opening between the fan and the blowout port of the cover member, such that the part of the gas sent in the centrifugal direction from the fan passes through the opening and is blown out from the blowout port.

2. The motor apparatus according to claim 1, wherein
the cover member includes a first portion that covers a side in the centrifugal direction of the fan, and a second portion that covers a side in the axial direction of the fan, and
the blowout port is provided in the first portion.

3. The motor apparatus according to claim 2, wherein
the second portion of the cover member has an intake port for allowing the fan to take gas therein.

4. The motor apparatus according to claim 1, wherein
the opening is provided in the protruding part so as to overlap with at least a part of the blowout port of the cover member in a rotation direction of the fan.

5. The motor apparatus according to claim 2, wherein
the cover member forms flow passages for flowing, along the outer surface of the motor, the gas sent from the fan in the centrifugal direction,
the flow passages include a gap between the first portion of the cover member and the protruding part of the motor case, and a gap between the second portion of the cover member and the protruding part of the motor case.

6. The motor apparatus according to claim 1, wherein
the motor case has a plurality of radiation fins extending along the axial direction on an outer surface, and
a protrusion amount in the centrifugal direction of an end of each of the radiation fins on a side of the cover member is made smaller than a protrusion amount of another portion.

7. The motor apparatus according to claim 6, wherein the ends of the radiation fins are covered with the cover member.

8. The motor apparatus according to claim 1, further comprising an air guide member for guiding, to an external mechanism of the motor apparatus, gas blown from the blowout port.

9. An electric power unit comprising:
the motor apparatus according to claim 1; and
an electrical component for driving the motor of the motor apparatus, wherein
the blowout port is provided in the cover member so as to blow out gas to the electrical component.

10. A working machine comprising
the electric power unit according to claim 9; and
a working unit that performs work by power from the electric power unit.

11. The motor apparatus according to claim 8, wherein the air guide member is arranged to communicate the opening of the motor case with blowout port of the cover member.

* * * * *